No. 786,520. PATENTED APR. 4, 1905.
F. A. RYTHER.
SHIELD FOR RICE HARVESTERS.
APPLICATION FILED MAY 20, 1904.
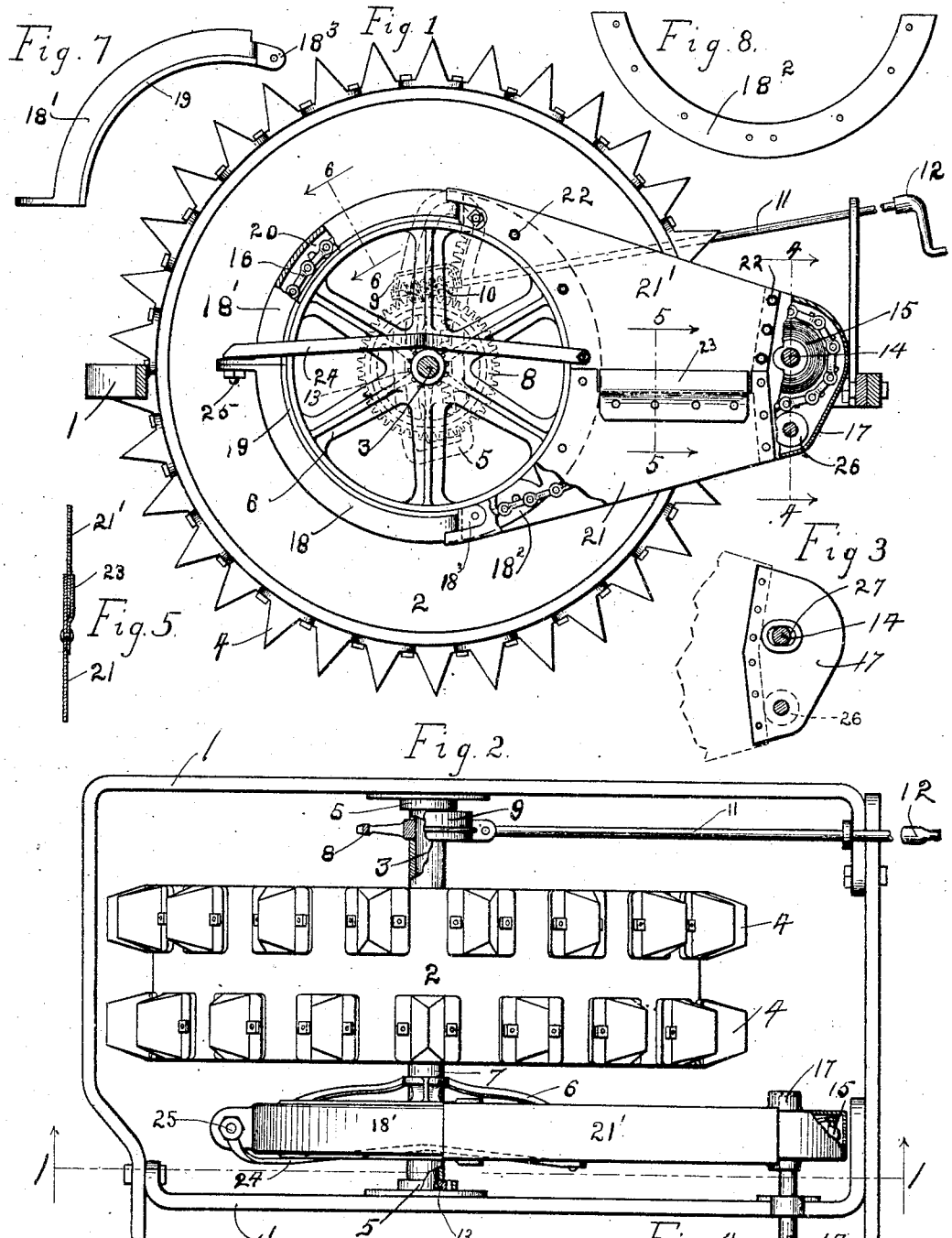
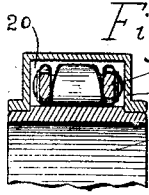
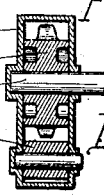
Witnesses:
J. N. Daggett
P. H. Alfrds
Inventor.
F. A. Ryther.
By J. C. Warnes,
Atty.

No. 786,520.

Patented April 4, 1905.

UNITED STATES PATENT OFFICE.

FRANK A. RYTHER, OF CHICAGO, ILLINOIS.

SHIELD FOR RICE-HARVESTERS.

SPECIFICATION forming part of Letters Patent No. 786,520, dated April 4, 1905.

Application filed May 20, 1904. Serial No. 208,967.

*To all whom it may concern:*

Be it known that I, FRANK A. RYTHER, a citizen of the United States, residing at Chicago, in the county of Cook and State of Illinois, have invented a new and useful Improvement in Shields for Rice-Harvesters, of which the following is a complete specification.

The invention relates to means for protecting the main driving-chain and driving-wheels of harvesters from mud, and is especially applicable to rice-harvesters.

It is well understood that rice is harvested from fields which have been but recently covered with water, and hence there is present a sediment and mud, which collects upon the periphery of the main wheel, from where it falls upon the driving-chain and sprocket-wheels, resulting in difficult operation and rapid wear of these parts. Such collection of the mud on the wheel and chain will occur unless the soil is either too wet or too dry to adhere, and heretofore no provision has been made to keep the mud from the sprocket chain and wheels.

While this invention is broadly applicable to various vehicles and machines, it is more particularly applicable to harvesters, which are usually constructed in such a manner that the relative position of the center of one of the sprocket-wheels is made to change with respect to the supporting-frame—such a change of position as results, for instance, when the frame of the harvester is made to rise and fall relative to the center of the main supporting-wheel. Such a construction renders it impractical to support the shield from the frame of the machine and makes necessary a connection which will permit the shield to move about the centers of the sprocket-wheels which it protects.

In the accompanying drawings, Figure 1 represents a grain-side elevation of the main supporting-wheel, the driving-sprockets, the driving-chain, and other parts in connection with which this improvement is shown, the view being taken as indicated by the line 1 1 in Fig. 2. Fig. 2 represents a corresponding plan of practically the same parts as shown in Fig. 1. Fig. 3 is a detached view in elevation of the rear end of the shield. Fig. 4 is a section taken as indicated by the line 4 4 in Fig. 1. Fig. 5 is a vertical section through a portion of one side of the shield, taken as indicated by the line 5 5 in Fig. 1. Fig. 6 is a transverse section taken through the rim of the main driving sprocket-wheel and adjacent portion of the shield as indicated by the line 6 6 in Fig. 1. Fig. 7 is a detail view of the upper quadrant-section of the shield which embraces the forward half of the main driving sprocket-wheel, and Fig. 8 is a detail of the arc-shaped brace which is secured to the margin of the shield contiguous to the rear half of the main driving sprocket-wheel.

In the drawings, 1 designates the main frame of the machine; 2, the main supporting-wheel; 3, the main supporting-wheel axle, and 4 the traction-lugs on the periphery of the said main supporting-wheel.

5 designates the side castings or hangers, one of which is secured to the main frame of the harvester on the stubbleward side thereof and one on the grainward side of the harvester to the longitudinal bar 1', which constitutes a portion of the main frame.

6 designates a sprocket-wheel secured to the hub 7 of the main wheel 2.

Rigidly secured to the axle 3 is the gear-wheel 8, and mounted in a suitable frame 9 is the worm-gear 10, (shown in dotted lines in Fig. 1,) which meshes with said gear-wheel. This worm-gear 10 is rigidly secured to and operated by the controlling-shaft 11, which receives on its rear end the crank 12 for turning said shaft. As this shaft 11 is rotated it will cause, through the intermediate gears 8 and 10, rotation of the axle 3, on the ends of which are secured the pinions 13. These pinions 13 mesh with the toothed rack in the side castings 5, thus causing relative vertical movement between the supporting-wheel 2 and main frame of the harvester—that is, the frame will be raised and lowered with respect to the supporting-wheel and in a manner well understood in this class of machines.

On the rear end of the main frame 1 is mounted the shaft 14, rigidly secured to which is the sprocket-wheel 15. This cross-shaft 14 communicates motion to the various operative parts of the machine. A chain 16 communicates motion from the driving-sprocket 6 to the sprocket-wheel 15.

17 is a casting recessed to receive the sprocket-wheel 15 and apertured to journal upon the shaft 14. This casting constitutes the rear end of the shield.

Mounted upon the rim of the driving-sprocket-wheel 6 are the quadrant-sections 18 and 18', provided with the flanges 19, which rest upon the flange of said wheel. These quadrant-sections are provided with an annular recess 20, adapted to receive the chain and teeth of the sprocket-wheel and are made in upper and lower sections in order to readily adapt them to be placed upon said wheel. On the quadrant-sections are the lugs $18^3$, (see Fig. 7,) by means of which said sections are connected with the metal sheets forming the shield and also with the arc-shaped bar $18^2$, (see Fig. 8,) which conforms to the curvature of flange of the sprocket-wheel 6 and strengthens that portion of the shield adjacent thereto. These quadrant-sections 18 and 18' afford a tight cover and good protection for the sprocket-chain and teeth and are movable upon said wheel about the center thereof. A shield is secured to the lugs $18^3$ on the sections 18 and 18', the shield connecting at the rear with the open side of the casting 17. This shield is preferably made also in two sections, as shown, to facilitate placing in position or removing when desired, 21 designating the lower section and 21' the upper section. This shield consists of metal sheets riveted or bolted, as at 22, to the adjoining members, the upper section being preferably bolted, as shown, in order to permit of its being readily removed. The cross-section of the shield is of rectangular form and of a width somewhat greater than the width of the chain which it receives. The upper and lower sections 21' and 21 of the shield unite with each other, as shown in Fig. 5, in which 23 is a strip riveted to the outside of said shield, the upper margins of said strip 23 and the lower section 21 being made flush and with a narrow slot between. In this narrow slot is received the lower edge of the upper section 21', as clearly shown in said Fig. 5. In order to relieve the flange of the sprocket-wheel 6 from the weight of the shield, a bar 24 is secured to the said shield at points near the periphery of the inclosed sprocket-wheel. This bar resting on the hub of the wheel will bring the pressure caused by the weight of the shield to bear at that point instead of upon the rim, and thus greatly reduce the friction. The quadrant-sections forming the forward portion of the shield which covers that part of the sprocket-wheel are secured together by the bolt 25, which also secures in position the forward end of the bar 24.

In the lower part of the casting 17 is journaled the tightener-roller 26. The hole 27 in this casting 17, which engages the cross-shaft 14, is slotted transversely, as shown in Fig. 3, in order to provide for a slight transverse movement of the shield with respect to said shaft 14 when such transverse movement is required, as may arise from a slight inaccuracy in the construction of the curved side castings or hangers 5.

What I claim as my invention, and desire to secure by Letters Patent, is—

1. In a harvester, in combination, a supporting-wheel, a main frame vertically adjustable relative thereto, means for effecting such vertical adjustment, a driving sprocket-wheel in effect integral and concentric with the said supporting-wheel, a sprocket-wheel suitably mounted in bearings upon the main frame, and a shield inclosing both the said sprocket-wheels, the said shield being provided with a pivotal bearing in connection with each sprocket-wheel, substantially as described.

2. In a harvester, in combination, a supporting-wheel, a main frame vertically adjustable relative thereto, means for effecting such vertical adjustment, a driving sprocket-wheel in effect integral and concentric with the said supporting-wheel, a sprocket-wheel suitably mounted in bearings upon the main frame and a shield inclosing both of said sprocket-wheels said shield being longitudinally movable to a limited extent with respect to the line of centers of said wheels, substantially as described.

3. In a harvester, in combination, a supporting-wheel, a main frame vertically adjustable relative thereto, means for effecting such vertical adjustment, a driving sprocket-wheel secured to and concentric with the said supporting-wheel, a cross-shaft mounted in suitable bearings on the said main frame, a sprocket-wheel secured to said cross-shaft, a chain connecting said sprocket-wheels and a shield one end of which engages and is supported by the said driving sprocket-wheel the other end thereof being supported upon the said cross-shaft, substantially as described.

4. In a harvester, in combination, a supporting-wheel, a main frame vertically adjustable relative thereto, means for effecting such vertical adjustment, a driving sprocket-wheel secured to and concentric with the said supporting-wheel, a cross-shaft mounted in suitable bearings on the said main frame, a sprocket-wheel secured to said cross-shaft, a chain connecting said sprocket-wheels and a shield one end of which engages and is supported by said driving sprocket-wheel the other end thereof being provided with a longitudinally-extending slot which engages and is supported by the said cross-shaft, substantially as described.

FRANK A. RYTHER.

Witnesses:
FRED. H. SMITH,
C. S. ADAMS.